July 27, 1954

L. W. ALVAREZ 2,685,027

RADIOACTIVITY MEASUREMENT

Filed July 11, 1946

Inventor:
Luis W. Alvarez
By
Attorney

July 27, 1954      L. W. ALVAREZ      2,685,027

RADIOACTIVITY MEASUREMENT

Filed July 11, 1946      4 Sheets-Sheet 2

Inventor:
Luis W. Alvarez
By: Robert A. Lavender
Attorney

July 27, 1954   L. W. ALVAREZ   2,685,027
RADIOACTIVITY MEASUREMENT
Filed July 11, 1946   4 Sheets-Sheet 3

Inventor:
Luis W. Alvarez
By:
Robert A. Lavender
Attorney

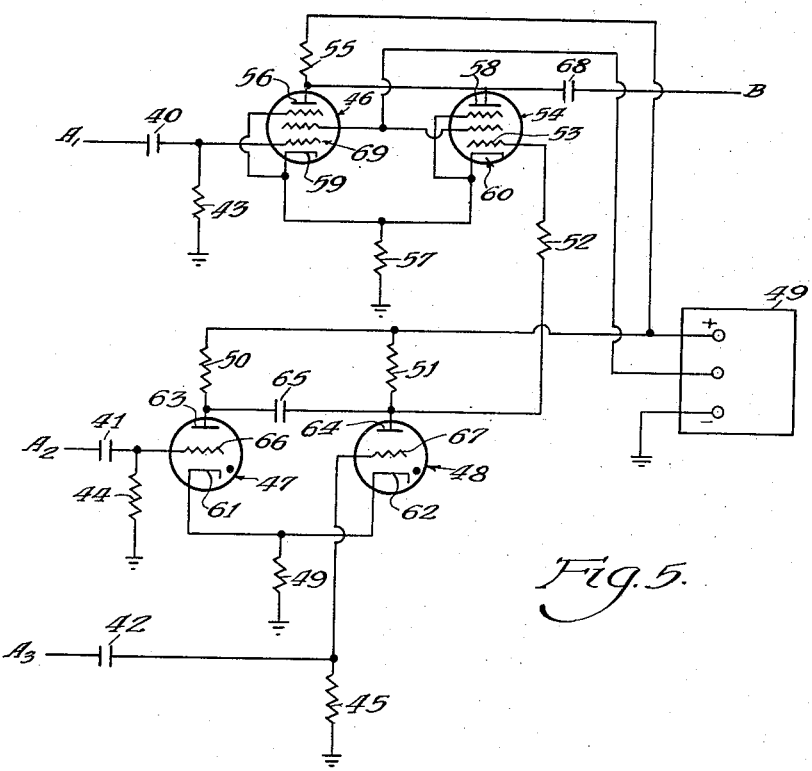
Fig.5.
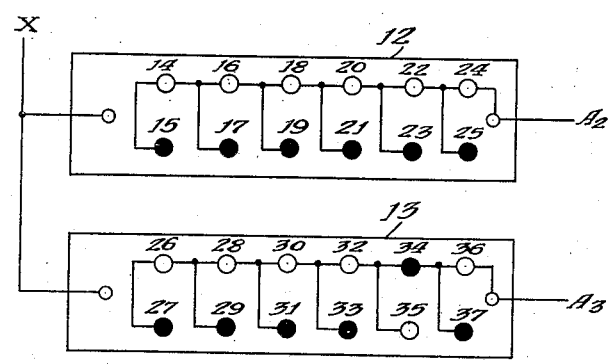
Fig.4.
Fig.6.
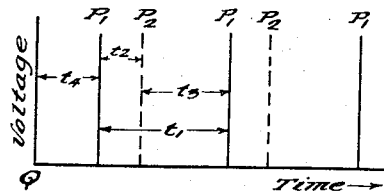
Inventor:
Luis W. Alvarez
By:
Robert G. [signature]
Attorney Patented July 27, 1954

2,685,027

UNITED STATES PATENT OFFICE 2,685,027

RADIOACTIVITY MEASUREMENT

Luis W. Alvarez, Berkeley, Calif., assignor to the United States of America as represented by the United States Atomic Energy Commission Application July 11, 1946, Serial No. 682,952

3 Claims. (Cl. 250—27)

This invention relates to a method and means for measuring and analyzing radioactivity which decays rapidly.

It is well-known that any quantity of a radioactive isotope of any element emits its characteristic particles or radiation as a negative exponential function of time, as expressed by the relation:

$$N = N_0 e^{-\lambda t}$$

where $N_0$ is the number of particles or radiations emitted per unit time at any given time $t_0$, N is the number of particles or radiations emitted per unit time $t$ time units later than $t_0$, $e$ is the base of natural logarithms and $\lambda$ is a constant which is characteristic of the particular isotope, and is called the decay constant. It is customary to describe the characteristic radiation of any isotope in terms of its half-life, which is defined as the time in which the intensity of emission from any quantity of the isotope decreases by a factor of one-half, and is therefore equal to $0.693/\lambda$.

Measurement of half-life is a common method of identification of elements and isotopes present in samples of radioactive material of unknown composition. In practice, this is accomplished by measuring the relative rates of occurrence of disintegrations at appropriate time intervals and plotting the logarithm of the counting rate as ordinate against time as abscissa. For samples containing a single radioactive isotope this plot is a straight line with its negative slope equal to $\lambda$. From this, the half life is computed and the sample identified.

The method in common use for performing the above measurements is the use of a scaler in the following manner: The sample under examination is placed in or near an ionization pulse detector such as a Geiger-Mueller tube or proportional counter whose pulses are counted by the scaler. The scaler is activated manually by a switch and is allowed to operate for a time of the order of a few minutes, at the end of which it is deactivated manually. The number of counts registered is recorded. This procedure is repeated at intervals until sufficient data have been obtained for making the plot. This method and means is unworkable for measuring short half-lives, of the order of a few minutes or less. Accuracy requires that both the periods of counting and the intervals between counting periods be short compared to the half-life. It is also required that the timing error in activating and deactivating the scaler be negligible in comparison with the period of counting.

The objects of the present invention are:

To provide an improved method and means of measuring short half-lives of radioactive materials;

To provide a means for accurately and automatically activating and deactivating a scaler or other electronic device at given short intervals of time;

To provide a means for counting events occurring in short periods of time, of the order of 4 seconds, and for separating such counting periods by intervals of similar magnitude, automatically and accurately; and To provide a means and method of counting separately the number of events occurring in each and every successive short interval of time.

Other objects and aims will be apparent from the description which appears below.

These objects are obtained by the electronic circuits and devices and the combinations of electronic circuits and devices illustrated in the accompanying drawing, in which—

Figure 4 is an expanded block diagram of the electronic circuits appearing in Figure 3(a) between point X and points $A_2$ and $A_3$;

Figure 3A:
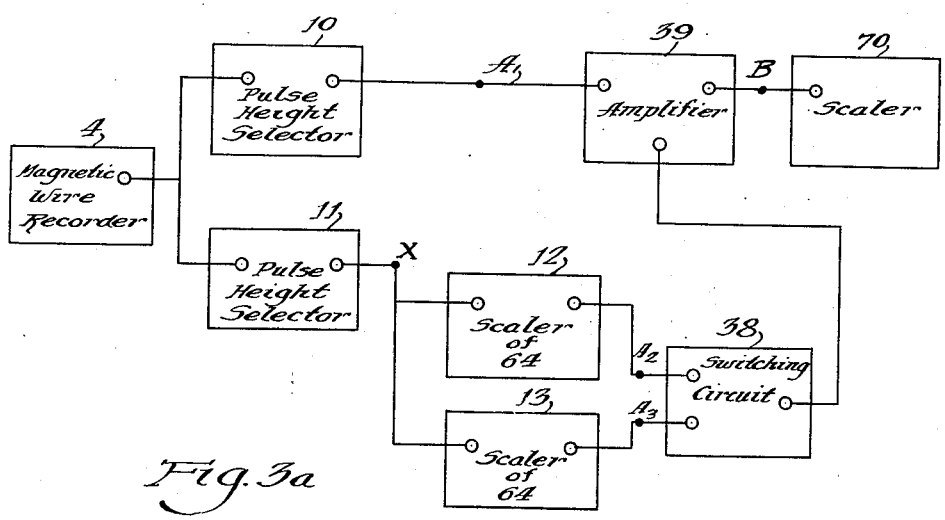
Figure 3(a) is a block diagram of the electronic devices combined to count the nuclear disintegrations from the record obtained by the devices of Figures 1(a) and 1(b), over predetermined periods separated by predetermined intervals.
Figure 3B:
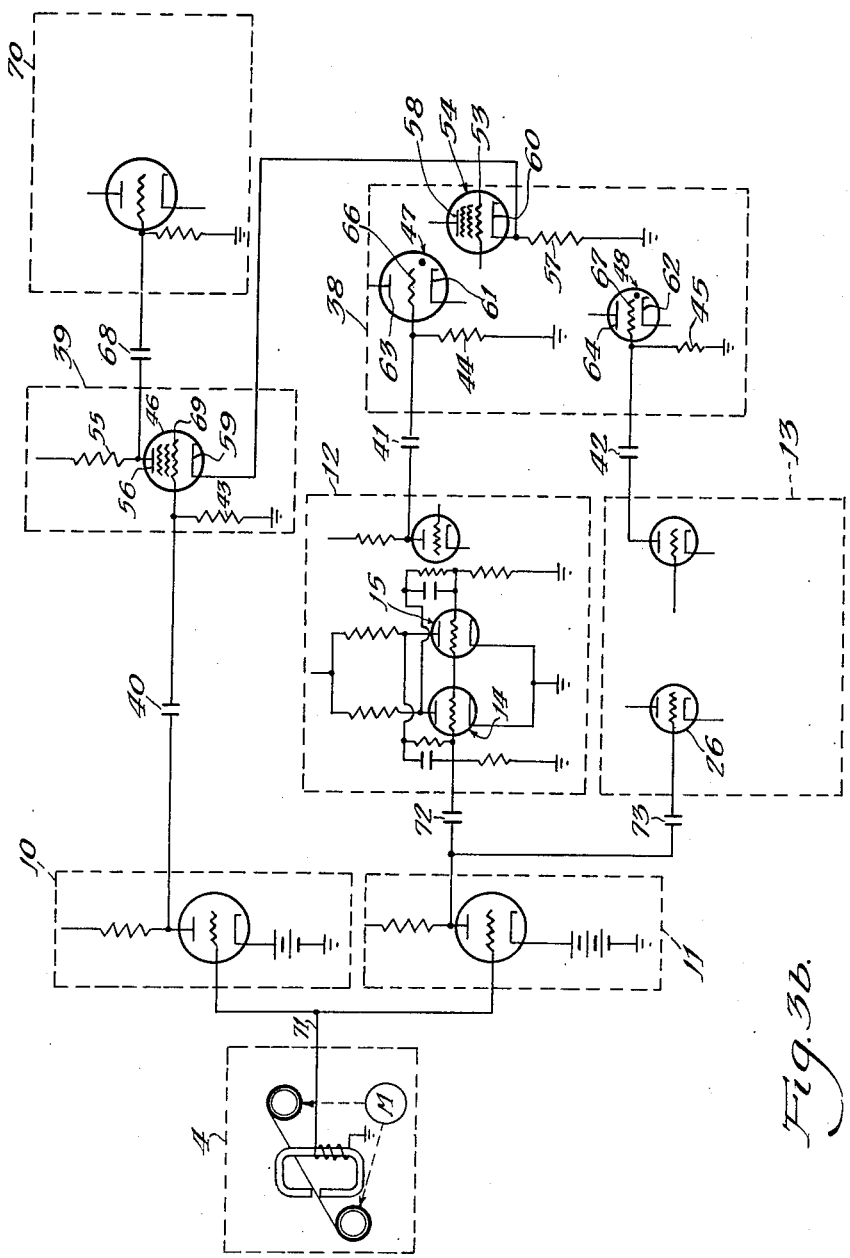
Figure 3(b) is an elemental schematic diagram thereof.

Figure 5 is a schematic diagram of the electronic circuits appearing between points $A_1$, $A_2$ and $A_3$ and point B of Figure 3(a); and Figure 6 is a diagrammatic representation of the output pulses from scalers 12 and 13 of Figures 3(a) and 3(b), under certain assumptions.

Figure 1A:
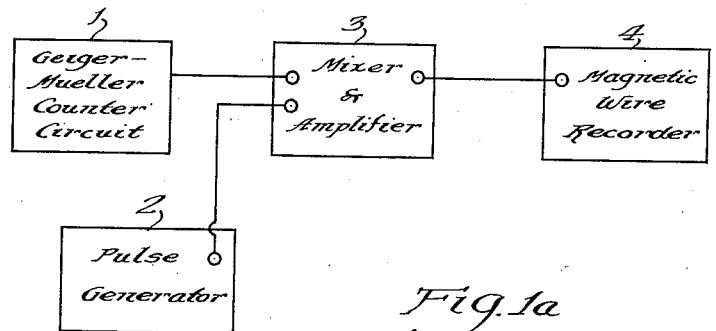
Figure 1(a) is a block diagram of the electronic devices combined to record the nuclear disintegrations as a function of time, with superimposed time-marking pulses.
Figure 1B:
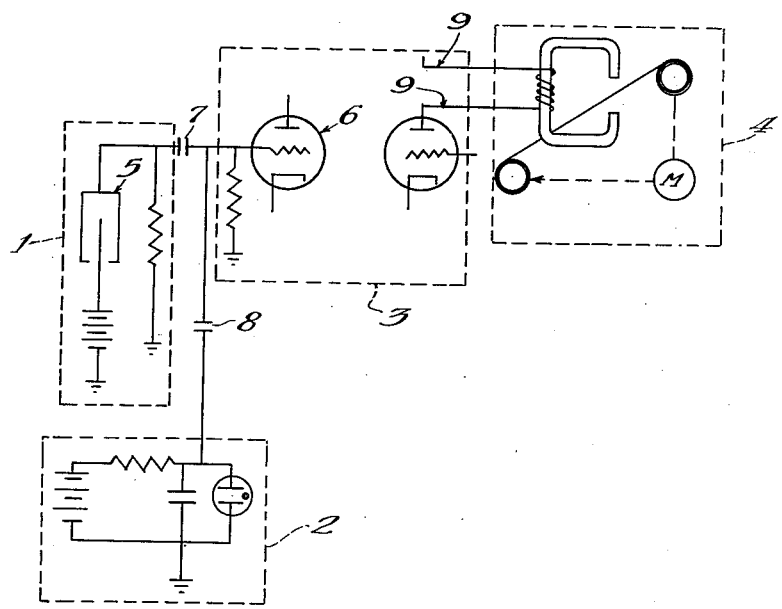
Figure 1(b) is an elemental schematic diagram thereof.

Referring to Figures 1(a) and 1(b), Geiger-Mueller counter circuit 1 is old and well-known in the art. It detects radioactivity by causing voltage pulses to appear at its output as a result of ionization caused in the Geiger-Mueller tube 5, the number of such pulses appearing in any given time being proportional to the intensity of the radiation to which the Geiger-Mueller tube 5 is exposed. It is suitable for the measurement of beta and gamma radiation and is the type of pulse-producing radiation detector in most common use in the fields of radioactivity and nuclear physics. In addition, it is the counter employed in the illustrated embodiment of the invention. However, it should be understood that the apparatus of the invention is suitable for use with any other pulse-producing detector of radiation or particles, such as a proportional counter or pulse ionization chamber. Further, the apparatus of the invention may be used with pulses or other voltage signals from sources other than detectors of radiation and particles.

Pulse-generator 2 is an electronic circuit which produces voltage pulses equally spaced in time, with the intervals between such pulses being long compared with the duration of such pulses. Such circuits are well known in the art of electronics and many are available on the commercial market. One form, particularly adapted for long intervals between pulses, consists of a gas-tube relaxation oscillator, illustrated as pulse-generator 2 of Figure 1(b). It will be understood that the exact form of pulse-generator 2 is not material to the invention. Any of the well-known pulse-generators capable of producing pulses of the approximate amplitude and frequency requirements described subsequently herein will suffice for the practice of the invention.

The combined mixer and amplifier 3 likewise constitutes an electronic device which is well-known in the art. The mixer is a circuit wherein two or more separate voltage signals are superimposed to form a single voltage signal. One of its simplest forms, and the one employed in the illustrated embodiment of the invention, constitutes a vacuum tube 6 upon the control grid of which both signals are impressed in parallel, the output from such vacuum tube constituting the mixed signal. For reasons which will become apparent below, the pulse-generator 2 must produce pulses greater in amplitude than the largest pulses produced by the Geiger-Mueller counter circuit 1, or sufficient additional amplification for such pulses from pulse-generator 2 must be provided in mixer and amplifier 3 to assure that the last-mentioned amplitude relationship appears in said single output signal of mixer and amplifier 3. In other words, in the output signal of mixer and amplifier 3 the voltage pulses representing equal intervals of time are greater in amplitude than the pulses representing ionizing particles in Geiger-Mueller counter circuit 1.

The magnetic wire recorder 4 is well known and several forms of this device are in the commercial market. Although such a recorder is used in the preferred embodiment of this invention, any recorder may be employed.

The operation of the combination of devices illustrated in Figures 1(a) and 1(b) is as follows: The randomly-spaced pulses from Geiger-Mueller counter circuit 1 and the periodic pulses from pulse-generator 2 are impressed on the grid of vacuum tube 6 through condensers 7 and 8, respectively, and are mixed and amplified in mixer and amplifier 3. The resultant signal is impressed on the wire recorder 4 by means of wires 9 and recorded.

Figure 2:
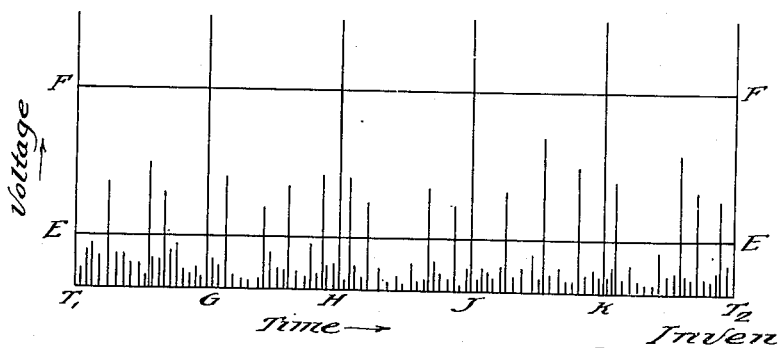
Figure 2 is a simplified and idealized graph of the voltage pattern recorded on recorder 4, Figures 1(a) and 1(b), as a function of time.

The graph constituting Figure 2 is a fragmentary idealized sample pattern of the signal recorded on recorder 4 as a function of time. Such a representation might be obtained by photographing a cathode-ray oscillograph trace, but making or otherwise obtaining such a graph is not material to my invention other than for illustrative explanation. The vertical pulses appearing along the horizontal time axis $T_1$—$T_2$ are voltage pulses whose amplitude is represented by their height. Those pulses which rise beyond the level indicated by the line F—F are the pulses produced by the pulse-generator 2 of Figures 1(a) and 1(b); these pulses are equally spaced in time and of equal amplitude. The pulses which rise beyond the level E—E but do not reach the level F—F are the pulses from the Geiger-Mueller counter circuit 1 representing ionizing particles. The pulses which do not reach the level E—E are stray voltages caused by such effects as vacuum tube noise and microphonics, electromagnetic pick-up and insulator leakage collectively referred to as noise. The graph of Figure 2 is simplified and idealized in that all the pulses are there represented as being sharp "pips" of negligible duration and unidirectional polarity. In actual practice the pulses are of finite length and thus two or more pulses occurring very close together in time may accumulate to produce an instantaneous voltage level greater than that of any of the individual pulses so occurring. In addition, the pulses from the Geiger-Mueller counter circuit 1 and the noise, in actual practice, create an additional small voltage pattern of opposite polarity with respect to voltage level $T_1$—$T_2$. However, for explanation of my invention the simplified presentation of Figure 2 suffices.

Referring now to Figures 3(a) and 3(b), magnetic wire recorder 4 is here operated in such a manner as to reproduce the voltage pattern previously recorded as described above. Pulse height-selectors 10 and 11 are well known in the art. The function of a pulse-height selector is to suppress the transmission of all pulses below a certain amplitude level and to transmit pulses of greater amplitude. There are many circuits widely known in the art for accomplishing this purpose, including, among others, diode clippers and one-shot multivibrators. One of the simplest, and the one used in my embodiment of my invention and illustrated in Figure 3(b), is the triode vacuum tube with its control grid biased beyond cut-off to such extent that the tube will not conduct until the positive input signal voltage exceeds a predetermined level. Thus any pulse whose amplitude is less than said predetermined level will produce no effect in the plate circuit of said tube, but a pulse which does exceed such level will produce a corresponding pulse in the plate circuit, such latter pulses constituting the output signal of the pulse-height selector. Pulse-height selector 10 is designed to transmit all pulses which rise above the level E—E of Figure 2 and to suppress those of lower amplitude. Pulse-height selector 11 is designed to transmit all pulses which rise above the level F—F of Figure 2 and to suppress those of lower amplitude.

Scalers-of-64 12 and 13 are likewise well-known in the art, but the novel way in which they are combined in the embodiment of my invention illustrated in the drawing and described herein requires a review of the principle of operation. Figure 4 is an expanded block diagram of that portion of Figure 3(a) between point X and points $A_2$ and $A_3$, constituting scalers-of-64 12 and 13. Since scalers 12 and 13 are identical, I will use only scaler 12 in describing the principle of operation. Scaler 12 is composed of six trigger pairs 14—15, 16—17, 18—19, 20—21, 22—23, and 24—25. Each of said trigger pairs consists of two tubes and associated components (only the first pair 14—15 being illustrated in Figure 3(b)) so designed that the pair has two stable conditions, each condition being conduction in one tube and total or virtual cut-off in the other. Thus, at any time, only one of the tubes is conducting. Irrespective of the existing condition, it is reversed by a negative pulse at the input to the pair. Likewise, irrespective of the condition of the pair, it is unaffected by a positive pulse at the input to the pair. The output from each pair is taken from one of the two tubes in such a manner that when the condition is reversed to cause that tube to conduct, a negative output pulse occurs, and when the condition is reversed to cause the tube to cease conducting a positive output pulse occurs. Thus, negative pulses at the input induce alternate positive and negative pulses at the output, and positive pulses at the input produce no effects at the output. It is clear, then, that since the positive pulses have no effect on a succeeding similar stage, the output of each stage may be regarded as one negative pulse for each two negative pulses at the input. By cascading six such stages, the last stage 24—25 is caused to go through one complete cycle of condition reversal for each 64 negative input pulses, all the stages resuming their original condition at every 64th input pulse.

Suppose that operation of scaler 12 is commenced with all corresponding tubes 14, 16, 18, 20, 22, 24 conducting, as indicated by the black shading of the non-conducting, tubes 15, 17, 19, 21, 23, 25 in Figure 4. Then on the 32nd pulse at the input X, a positive pulse will appear at the output A₂. Further positive pulses will appear at the output A₂ on the 96th, 160th and every successive 64th negative input pulse. Negative pulses will also appear at the output A₂, but these will be disregarded here, as it will be seen below that switching circuit 38 of Figures 3(a) and 3(b) is unaffected by negative pulses.

Scaler 13 is identical with scaler 12 in construction and operation. Suppose now that contemporaneously with the operation of scaler 12 last described above, operation of scaler 13 is commenced with all but the fifth stage 34—35 in the condition mentioned above in connection with scaler 12, that is with tubes 26, 28, 30, 32, 35, and 36, conducting and tubes 27, 29, 31, 33, 34, and 37 non-conducting. It may be seen that this overall condition is identical with the condition reached by scaler 12 after 16 pulses. We may say for convenience that scaler 13 has been pre-set with 16 pulses added. Thus scaler 13 will produce at its output A₃ positive pulses on the 16th, 80th, 144th and every successive 64th negative input pulse, always 16 input pulses earlier than the corresponding positive pulse produced at output A₂ by scaler 12. Scaler 13 may be set so as to lead scaler 12 by a number of pulses other than 16 by similar pre-setting; such interval of lead, or non-synchronism, may be any number of input pulses from 1 to 63.

Likewise, for any given interval of lead, the time of both output pulses may be advanced or retarded in relation to a given time of reference by pre-setting both scalers 12 and 13 in an appropriate manner. As an instance, suppose operation is commenced with tubes 14, 16, 18, 20, 23, 25 of scaler 12 conducting and tubes 26, 28, 30, 32, 34, 36 of scaler 13 conducting. It is easily seen that scaler 13 now commences with no pulses added and thus will produce its output pulses 16 input pulses later than it did in the operation described in the last preceding paragraph, its first positive output pulse appearing at the 32nd input pulse. As regards scaler 12, the situation is slightly more complex, as it appears to have 48 pulses added, rather than 16 pulses subtracted. However, upon study it is apparent that it will produce its first positive output pulse on the 48th input pulse, rather than on the 32nd, as it did in the operation previously described. Thus the operation of both scalers 12 and 13 has been effectively delayed by 16 input pulses, as compared with the operation described in the preceding paragraph, but the repetition interval of the pulses and the interval between output pulses of the two scalers has been preserved. In an analogous manner, the scalers may be preset to advance or retard the cycle of output pulses with respect to the reference time by any number from 1 to 63 input pulses.

With the above explanation, the operation and utility of this portion of my invention may be understood by reference to Figure 6. In this diagrammatic representation of the output pulses from scalers 12 and 13 as a function of time, the broken lines P₂ represent the output pulses of scaler 12 and the solid lines P₁ represent the output pulses of scaler 13. Figure 6 does not represent the voltage pattern at any one point in the circuit; it represents the individual outputs of scalers 12 and 13 at points A₂ and A₃, respectively, in their proper relationship in time, with the ordinate axis as the reference time Q. In addition, the diagram omits pulses of negative polarity, which are not of present interest, as will be seen below. The diagram assumes that the input X to the scalers 12 and 13 consists of pulses equally spaced in time, commencing at reference time Q.

The time $t_1$ is the time required for the occurrence of 64 pulses at the input X, and delineates the interval between pulses P₁, and likewise the interval between pulses P₂. The time $t_2$ is the time in each repeating cycle between pulses P₁ and P₂, where each cycle of time $t_1$ is considered to commence with the occurrence of pulse P₁. Time $t_3$ is the time interval between the occurrence of pulse P₂ and the commencement of the next cycle by occurrence of a pulse P₁. By the use of my invention, pairs of pulses P₁P₂ may be produced with any desired repetition time $t_1$ by providing input pulses with 64 times the repitition rate of the desired output pulses. The time $t_2$ may be varied at will in multiples of the repetition time of the input pulses by varying the difference between the number of pulses added in pre-setting scaler 12 and the number of pulses added in pre-setting scaler 13, in the manner described above. Time $t_3$ is likewise varied thus, with the limitation that the sum of times $t_2$ and $t_3$ is by definition equal to the time $t_1$. Time $t_4$ is the time between reference time Q, at which the input signal consisting of periodic single pulses commences, and the time of occurrence of the first output pulse from scaler 13, P₁. Time $t_4$ may be varied in any multiple of the time interval between input pulses by varying the number of pulses added in pre-setting scalers 12 and 13, keeping the difference between the number of pulses added in pre-setting the two scalers 12 and 13 constant, as described above.

In this manner, the scalers 12 and 13 may be each caused to produce positive voltage pulses of the desired frequency of repetition, the amount of time by which the repetition cycle of one scaler leads or lags the repetition cycle of the other being variable in steps of 1/64 of the repetition time and the time relationship with reference to any given point in time being likewise variable in steps of 1/64 of the repetition time.

Switching circuit 38 is employed to activate and deactivate amplifier 39. A schematic diagram of the portion of block diagram Figure 3(a) between points $A_1$, $A_2$, $A_3$, and point B, comprising switching circuit 38 and amplifier 39, appears as Figure 5. Operation of this circuit is as described below.

Condensers 40, 41, 42 are input coupling condensers and resistors 43, 44, 45 are grid resistors of tubes 46, 47, 48, respectively. Resistor 49 is the common cathode resistor of tubes 47 and 48 connecting the cathodes 61, 62 of these tubes to ground, and thus to the negative side of the plate power supply 49. Resistors 50 and 51 are the plate load resistors of tubes 47 and 48, respectively, and connect the plates of said respective tubes to the plate power supply 49. Resistor 52 connects the plate of tube 48 to the control grid 53 of control tube 54. Resistor 55 is the plate load resistor of amplifier tube 46 and connects the plate 56 of amplifier tube 46 to the plate power supply 49. Resistor 57 is the common cathode resistor of amplifier tube 46 and control tube 54, connecting the cathodes 59 and 60 of these tubes to ground. Plates 56 and 58 are directly connected with each other, as are cathodes 59 and 60, and cathodes 61 and 62, respectively. Plates 63 and 64 are connected by condenser 65. Tubes 46 and 54 are pentode vacuum tubes and tubes 47 and 48 are gas-filled thyratron tubes.

In the absence of signal on grids 66 and 67 of tubes 47 and 48, the circuit of Figure 5 is in one of two stable conditions, in one of which amplifier tube 46 is deactivated and delivers no signal at its output B, and in the other of which amplifier tube 46 delivers to its output B through condenser 68 a signal constituting an amplified reproduction of the signal appearing at the input, point $A_1$. There will first be described the condition of the circuit in which amplifier tube 46 is cut off and inactive. In this condition tube 47 is conducting and tube 48 is not conducting. The potential of plate 64 is therefore far positive with respect to ground. Grid 53 is at essentially the same potential as plate 64. Therefore tube 54 will conduct a large plate current, such plate current flowing through resistor 57 to ground, thus causing cathodes 59 and 60 to be far positive with respect to ground. Since grid 69 of tube 46 is essentially at ground potential, grid 69 is far negative with respect to cathode 59 and the plate current in tube 46 is completely cut off and does not produce any output signal at its plate 56 to correspond to an input signal at point $A_1$.

Now suppose the appearance of a positive pulse at input point $A_3$. Tube 48 fires and conducts plate current, thus lowering the potential at its plate 64. This negative pulse of voltage is transmitted through condenser 65 to plate 63, thus extinguishing the plate current in tube 47. At the same time, because of the lowered potential at plate 64, the potential at grid 53 is likewise lowered, thus lowering the plate current in tube 54 to such an extent that the voltage appearing across resistor 57 is no longer sufficient to cut off plate current in tube 46. Tube 46 thereafter acts as an ordinary resistance-coupled amplifier until the process is reversed by the appearance of a positive pulse at input point $A_2$, at which time amplifier tube 46 is again deactivated. Negative pulses at input points $A_2$ and $A_3$ have no effect on the conducting conditions of thyratron tubes 47 and 48.

Referring now again to Figures 3(a) and 3(b), scaler 70 is similar to scalers 12 and 13, but is here used for its ordinary purpose of counting the pulses transmitted by amplifier 39.

The individual circuits designated by blocks in Figure 3(a) and schematically diagrammed in elemental fashion in Figure 3(b) having been described, it is now desirable to describe the overall operation of the combination illustrated in Figures 3(a) and 3(b) and the method employed in counting.

Magnetic wire recorder 4 reproduces the voltage pattern previously recorded on it, a fragmentary sample of which is illustrated in Figure 2. The repetition period G—H, H—J, J—K, of the periodic pulses, is ¼ second. The voltage pattern of Figure 2 appears as the input to pulse height selectors 10 and 11 through wire 71. Pulse-height selector 10 transmits to amplifier 39, by means of condenser 40, all the pulses of voltage amplitude greater than level E—E. Pulse-height selector 11 transmits to scalers 12 and 13 by means of condensers 72 and 73 only those pulses greater than level F—F, constituting the periodic pulses separated by ¼ second. Scalers-of-64 12 and 13 are preset as described above so that the output positive pulses of scaler 13 lead the output positive pulses of scaler 12 by 16 pulses, or 4 seconds. By means of switching circuit 38, the positive pulse from scaler 13 activates amplifier 39, which transmits the pulses from pulse-height selector 10 to scaler 70 through condenser 68. 4 seconds later, the positive pulse from scaler 12 deactivates amplifier 39 and thus stops the counting action of scaler 70. After 12 more seconds, amplifier 39 is again activated, scaler 70 commences to count, and the cycle is repeated until the end of the recording being reproduced. The operator need only note the number of counts appearing on the scaler 70 in each interval. For great accuracy, or for counting samples of low intensity, the 16 counts per four seconds representing pulse generator pulses, which will be recorded in addition to the ionization pulses, may be later subtracted.

In counting samples of very short half-life, of the order of one-half minute, much of the decay will take place within the 12 second period between the first and second counting intervals. Furthermore, in any case, it is desirable to obtain the maximum data. By four successive reproductions of the record, varying the time $t_4$ of Figure 6 with the commencement of the record as reference point Q, the disintegrations occurring in every successive 4 second period may be counted.

Persons skilled in the art may readily devise equivalents and other uses for the invention. As an obvious instance, in applications where it is not necessary to procure data from all successive time intervals, mixer and amplifier 3, magnetic wire recorder 4 and pulse-height selector 11 may be eliminated; in this case the output of Geiger-Mueller tube circuit 1 would be impressed directly on pulse-height selector 10, and the output of pulse-generator 2 would be impressed directly on the inputs to scalers 12 and 13. As another obvious instance, the device may be used for counting any voltage pulses, not merely those from a Geiger-Mueller counter; one application might be to counting pulses from a photoelectric tube on any of the well-known production-line counting devices. The combination of scalers 12 and 13 might be used with a pulse generator for calibrating the time-base sweep of a cathode-ray oscilloscope. The applications of switching circuit and amplifier 38, 39 are likewise numerous.

The method of counting radioactive samples over successive time intervals by recording the whole sequence and repeatedly reproducing the record, counting a different portion of the record upon each reproduction, likewise may be practiced without the precise apparatus described. The method might advantageously be applied even where the scaler 70 is manually operated, for the present methods of manual operation do not afford the possibility of counting over each and every successive time interval.

What is claimed is:

1. Apparatus for periodically activating and deactivating an electronic device at preset time intervals, such means comprising, in combination, a source of periodic voltage pulses, two electronic scalers of identical scaling ratios, an electronic switching circuit, means to impress said periodic voltage pulses on the inputs to both of said scalers, and means to impress the outputs of said scalers upon the input of said switching circuit wherein said scalers are preset with one or more of their corresponding scaling pair stages in opposite conditions of stable equilibrium so that with the same input to both scalers, the output pulse of a given polarity from one scaler will lag the output pulse of the same polarity from the other scaler by a time interval corresponding to a definite and certain number of input pulses, and wherein said switching circuit is adapted to alternately activate and deactivate such electronic device as such output signals of said scalers are impressed upon it.

2. Apparatus for controlling the periods of transmission, and intervals between such periods, of an electrical voltage signal upon which are superimposed pulses marking equal time intervals, such apparatus comprising, in combination, an electronic pulse-height selector, two electronic scalers of identical scaling ratios, an electronic switching circuit, an amplifier, means to transmit said voltage signal to said pulse-height selector and to said amplifier, means to transmit the output signal of said pulse-height selector to said scalers, and means to transmit the output signal of said scalers to said switching circuit, wherein said scalers are preset with one or more of their corresponding scaling pair stages in opposite conditions of stable equilibrium so that with the same pulse input to both scalers, the output pulse of a given polarity from one scaler will lag the output pulse of the same polarity from the other scaler by a time interval corresponding to a definite and certain number of input pulses and wherein said pulse-height selector is adapted to transmit only said pulses marking equal time intervals, which said pulses then constitute the input to both said scalers and the output signals of said scalers are impressed upon the inputs of said switching circuit, which said switching circuit is adapted alternately to activate and deactivate said amplifier as such signals of given polarity are impressed upon it.

3. Apparatus comprising, in combination, two electronic scalers, each having a plurality of scaling pair stages, wherein said scalers are preset with one or more of their corresponding scaling pair stages in opposite conditions of stable equilibrium, so that with the same input to both scalers the output pulse of a given polarity from one scaler will follow the output pulse of the same polarity from the other scaler by a time interval corresponding to a definite and certain number of input pulses, and an electronic switching circuit connected to the two electronic scalers.

References Cited in the file of this patent

UNITED STATES PATENTS

| Number | Name | Date |
|---|---|---|
| 1,444,886 | Rounds | Feb. 13, 1923 |
| 2,378,389 | Begun | June 19, 1945 |
| 2,403,918 | Grosdoff | July 16, 1946 |
| 2,408,086 | Meacham et al. | Sept. 24, 1946 |